Figure 1:
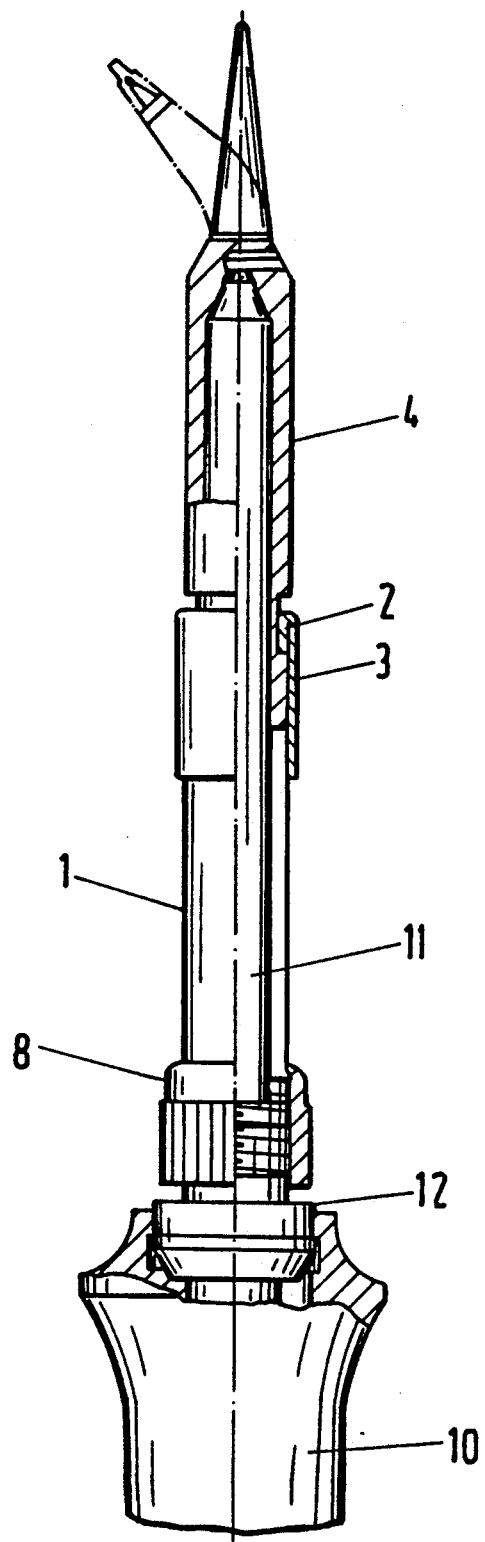

United States Patent [19]

Eisele et al.

[11] Patent Number: 5,248,076
[45] Date of Patent: Sep. 28, 1993

[54] SOLDERING TOOL

[75] Inventors: Ernst Eisele, Walheim; Fritz Eisele, Besigheim, both of Fed. Rep. of Germany

[73] Assignee: Cooper Industries, Inc., Houston, Tex.

[21] Appl. No.: 834,232

[22] PCT Filed: Aug. 21, 1990

[86] PCT No.: PCT/EP90/01387

§ 371 Date: Mar. 30, 1992

§ 102(e) Date: Mar. 30, 1992

[87] PCT Pub. No.: WO91/02618

PCT Pub. Date: Mar. 7, 1919

[30] Foreign Application Priority Data

Aug. 22, 1989 [DE] Fed. Rep. of Germany ... 8910049[U]

[51] Int. Cl.[5] .............................................. B23K 3/02
[52] U.S. Cl. ........................................ 228/54; 228/55; 219/229; 219/238; 403/349
[58] Field of Search ............... 228/54, 55; 403/349; 219/230, 238, 239, 229

[56] References Cited

U.S. PATENT DOCUMENTS

| 450,093 | 4/1891 | Beutelspacher | 228/55 |
| 1,561,134 | 11/1925 | Woolman | 228/55 |
| 2,512,426 | 6/1950 | Hartley | 228/55 |
| 3,423,781 | 1/1969 | Henson | 403/349 |
| 3,963,361 | 6/1976 | Schenk | 403/349 |

FOREIGN PATENT DOCUMENTS 2412060 9/1975 Fed. Rep. of Germany.
0506482 6/1985 Fed. Rep. of Germany.

Primary Examiner—Mark Rosenbaum
Assistant Examiner—Jeffrey T. Knapp
Attorney, Agent, or Firm—William B. Patterson; Eddie E. Scott; Alan R. Thiele

[57] ABSTRACT

A soldering tool comprises a handle (10) and a rod-shaped or tubular heating element fastened to the front end of the handle. A soldering tip (4) can be placed on the free end of the heating element. The soldering tip (4) has a borehole for receiving the free end of the heating element and can be fixed to the handle (10) or heating element by means of a fastening sleeve (1). The end of the fastening sleeve (1) nearer the soldering tip has first rotary catches (2, 3) which can be locked by second rotary catches (5) arranged at the rear end of the soldering tip (4) by turning the fastening sleeve (1) relative to the soldering tip (4).

6 Claims, 3 Drawing Sheets

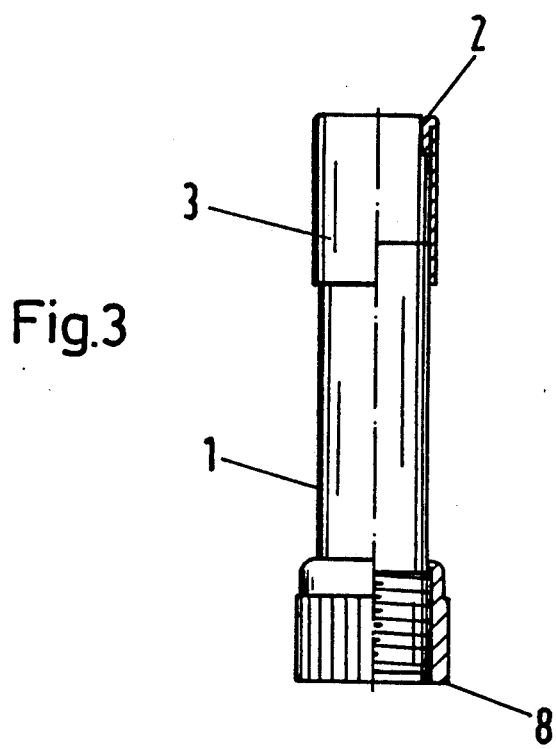
Fig.3
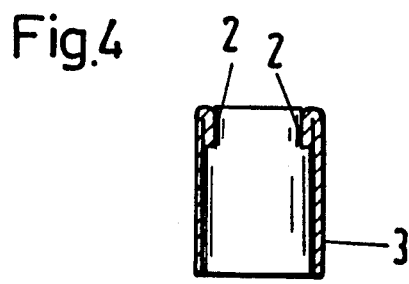
Fig.4
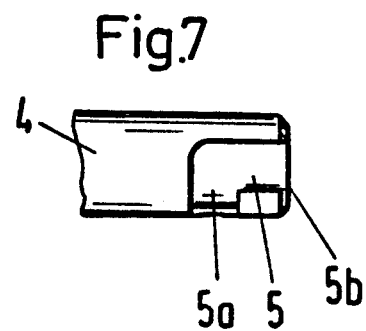
Fig.7
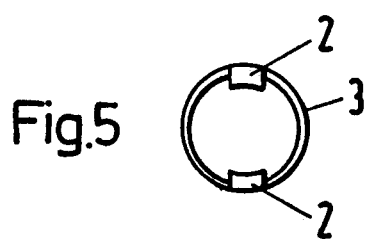
Fig.5
Fig.6
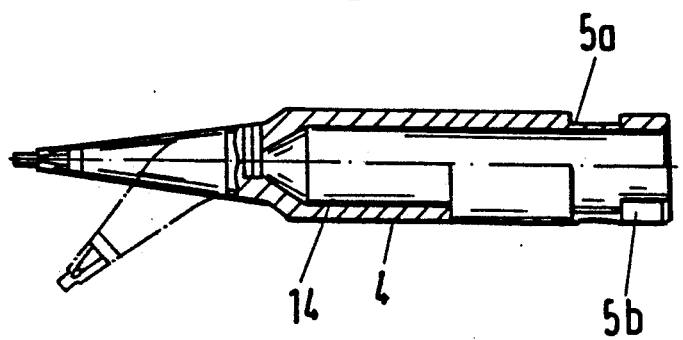

SOLDERING TOOL

The invention relates to a soldering tool comprising a handle and a rod-like or tubular heating element which is secured to the front end of the handle and onto the free end of which a soldering tip can be fitted which is provided with a bore for receiving the free end of the heating element and which can be locked to the handle or the heating element with the aid of a fastening sleeve which comprises at its end facing the handle a union nut for securing to a threaded extension of the handle. According to the invention, the sleeve is attached to the handle via the union nut and provides rigidity between the soldering tip and the sleeve.

Such a soldering tool is described inter alia for example in DE-U-85 08 482. In such a soldering tool the soldering tip is pushed through the interior of the fastening sleeve or said fastening sleeve is pushed onto the soldering tip fitted onto the rod-like or tubular heating element, the front end of the fastening sleeve engaging over the soldering tip and cooperating with a fastening bead on the soldering tip to firmly clamp the latter against the tubular or rod-like heating element. The fastening sleeve itself is secured with a sort of union nut or the like to a threaded extension at the front end of the handle or the rear end of the heating element. To permit the use of bent soldering tips as well, the fastening sleeve is provided with an elongated cutout at the outer periphery through which the end of the soldering tip serving for the soldering and the body of the soldering tip can be inserted, whereupon the soldering tip can be pivoted into the final position in the interior of the union sleeve. The soldering tip and the fastening sleeve can then be pushed onto the heating element and clamped. This type of configuration of the fastening sleeve permits however only the fastening of soldering tips having a maximum outer diameter which is smaller than the inner diameter of the fastening sleeve. Furthermore, the handling of such fastening sleeves on inserting the soldering tips is complicated in many cases, in particular when both the soldering tip and the fastening sleeve are hot.

DE-A1-24 12 060 further discloses a soldering tool, the handle of which carries at its front end a socket into which a soldering tip provided with its own heating element can be inserted, said soldering tip together with the heating element being secured in the sleeve by a bayonet fastener and mechanically locked via a resilient contact and being able to brought into electric connection with a current supply. No separate fastening sleeve is provided here.

The invention is based on the problem of providing a soldering tool of the type mentioned at the beginning in which in spite of using a fastening sleeve, soldering tips of any desired shape and outer dimensions can be employed and can be rigidly attached to the sleeve.

This problem is solved by the features set forth in the characterizing clause of claim 1.

Advantageous embodiments and further developments of the invention will be apparent from the subsidiary claims.

With the configuration of the fastening sleeve and the soldering tip according to the invention it is no longer necessary to push the soldering tip through the fastening sleeve; instead, the fastening sleeve and the soldering tip are connected together and locked with the aid of the rotary engagement means formed at the facing ends of the fastening sleeve and the soldering tip, said locking being achieved on turning the fastening sleeve with respect to the soldering tip.

The rotary engagement means can be formed in the manner of a bayonet fastener and include detent projections and detent grooves on the parts to be secured to each other.

The soldering tip can both be inserted into the free end of the fastening sleeve and engage over the latter, the engagement means of the fastening sleeve being arranged accordingly at the inner periphery or the outer periphery thereof.

In each case the detent groove comprises an axially extending section and a peripherally extending section which starting from the axial section is directed in such a direction that on tightening of the fastening sleeve engagement of the detent projection into the peripherally extending section of the groove results. The detent groove can be formed on the soldering tip; in that case, the fastening sleeve carries the detent projection, or the detent groove can be formed on the fastening sleeve whilst the soldering tip carries the detent projection.

Preferably, respective diametrically opposite detent grooves and detent projections are provided on the two parts to be connected. However, another number of detent projections and detent grooves is also possible.

An example of embodiment of the invention will be explained in detail hereinafter with the aid of the drawings.

Figure 2:
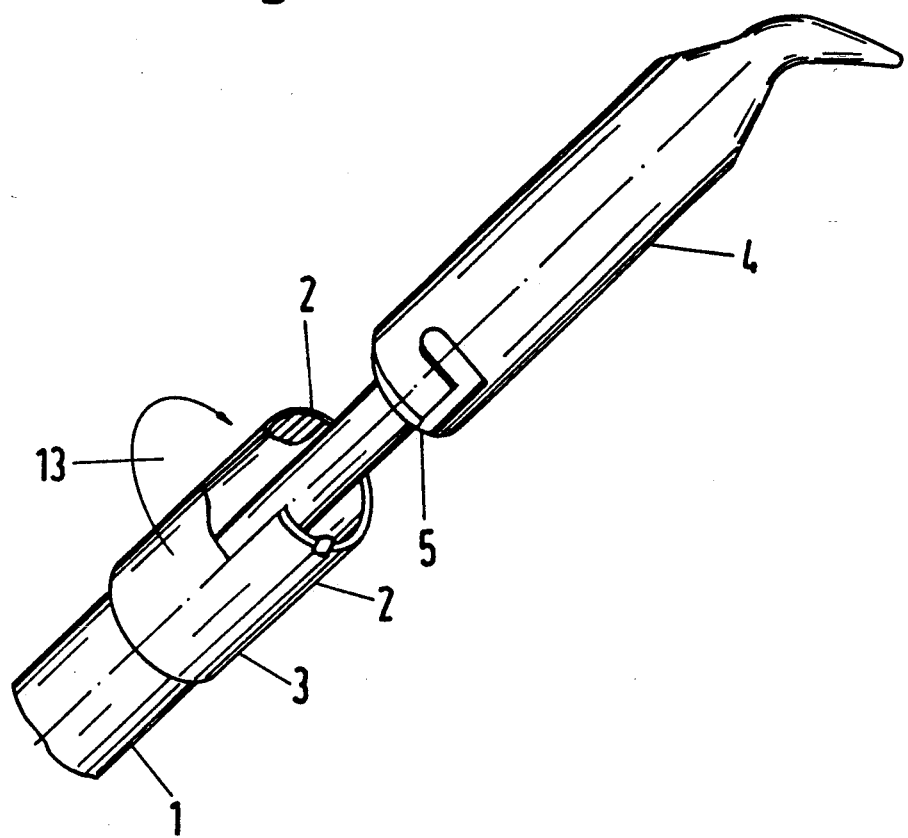

In the drawings:

FIG. 1 shows a partially sectioned view of a soldering tool including an embodiment of the fastening sleeve and soldering tip, FIG. 2 is a perspective view of the free end of the fastening sleeve and the soldering tip cooperating therewith, FIG. 3 is a partially sectioned view of the embodiment of the fastening sleeve, FIGS. 4 and 5 are a partial view of the fastening section of the fastening sleeve, FIG. 4 being a side elevation and FIG. 5 a plan view of the fastening section from above, FIG. 6 is a partially sectioned side elevation of an embodiment of the soldering tip, FIG. 7 is a view of the rear end of the soldering tip showing the detent groove more clearly.

FIG. 1 shows an embodiment of the soldering tool comprising an only partially illustrated front end of the handle 10 to which a rod-like or tubular heating body 11 is secured, onto the front end of which a soldering tip 4 is pushed. The soldering tip 4 is secured with the aid of a fastening sleeve 1 to the handle 10 or the heating body 11, the fastening sleeve being secured with the aid of a union nut 8 to a fastening portion of the handle or heating body 11 comprising an outer thread 12. As can be appreciated in FIG. 1, the tightening of the sleeve/tip combination onto the handle via thread 12 causes the end of the heating rod 11 to contact the interior of the soldering tip 4 thereby removing any slack in the sleeve/tip connection and causing the tip to be held rigidly within the sleeve.

Between the fastening sleeve 1 and the soldering tip 4 rotary engagement means are formed which will be explained in more detail hereinafter and which can be brought into engagement with each other on a relative rotation between the soldering tip 4 and the fastening sleeve 1. This relative rotation, leading to a locking together of the parts, is preferably in the fastening direction of the fastening sleeve 1, i.e. in a direction in which the union nut is tightened on the outer thread 12.

As is particularly apparent from the perspective view of FIG. 2, in the embodiment illustrated the fastening sleeve 1 comprises at its free end detent projections 2 which are formed on a detent sleeve 3, the detent projections 2 extending diametrically opposite each other in the interior of the free end of the detent sleeve 3.

The soldering tip 4 comprises a detent groove 5 which in accordance with FIG. 7 has an axially extending section 5b and a peripherally extending section 5a which originates from the axially extending section 5b and extends in the direction of the tightening turning of the fastening sleeve 1 which is indicated by the arrow 13 in FIG. 2.

Of course, the rotary engagement means shown in FIG. 2 could also be formed in converse manner, i.e. the detent sleeve 3 could have a detent groove whilst the soldering tip 4 comprises detent projections cooperating therewith.

Furthermore, although in FIG. 2 the case of insertion of the soldering tip 4 into the detent sleeve 3 is shown, the converse case is also conceivable in which the rotary engagement means are formed on the outer periphery of the detent sleeve and on the inner periphery of the soldering tip.

In FIG. 3 the fastening sleeve 1 is shown separately in order to illustrate the details more clearly. As apparent from FIG. 3 the fastening sleeve 1 is rotatable in the union nut 8 with the aid of a beading but is rigidly secured in the axial direction and carries at its side facing the soldering tip a pushed-on detent sleeve which can be made separately and is provided with two detent projections in the form of lugs 2 bent into the interior of the fastening sleeve 1.

Said fastening sleeve is shown in detail in FIGS. 4 and 5. The separate production of the detent sleeve 3 and the fastening sleeve 1 permits simplified manufacture.

FIGS. 6 and 7 show details of the soldering tip 4 which may have both a straight tip (shown in full lines) or a bent tip (shown in dot-dash lines). The soldering tip 4 comprises an inner bore 14 for receiving the free end of the heating body 11 and it is provided at its rear end with the already mentioned detent groove 5 which in accordance with FIG. 7 has a peripherally extending section 5a and an axially extending section 5b which merge into each other.

Irrespective of whether the rear end of the soldering tip engages over the fastening sleeve 1 or is inserted into the latter, there are no restrictions on the shaping and dimensions of the soldering tip due to the shape and dimensions of the fastening sleeve and consequently the fastening sleeve described can be used with a great number of shapes and dimensions of soldering tips.

We claim:

1. A soldering tool, said soldering tool comprising:
   a handle;
   an elongated tubular heating element secured at a first end to said handle;
   a soldering tip, said soldering tip constructed and arranged to receive a second end of said heating element;
   a fastening sleeve, said fastening sleeve constructed and arranged to extend between said handle and said soldering tip and having a nut at a first end for threaded connection to said handle;
   first rotary engagement means at said second end of said fastening sleeve;
   mating rotary engagement means at said first end of said soldering tip;
   whereby said soldering tip and said fastening sleeve are locked together with relative rotary motion between said tip and said sleeve and as said nut at said first end of said sleeve is tightened, said soldering tip is held in rigid connection at said second end of said fastening sleeve.

2. The soldering tool in 1, wherein said first rotary engagement means at said second end of said fastening sleeve includes at least one detent projection extending in a radial direction; and
   said mating rotary engagement means at said first end of said soldering tip includes at least one detent groove which cooperates with said at least one detent projection, said at least one detent groove extending first axially and then in a peripheral direction of said soldering tip; whereby,
   said peripherally extending section of said detent groove extends from said axially extending section in such a direction that upon tightening of said fastening sleeve, said detent projection engages said peripherally extending section of said detent groove.

3. The soldering tool in 2, whereby two detent projections are diametrically opposite each other on said second end of said fastening sleeve and two detent grooves are diametrically opposite each other at said first end of said soldering tip.

4. The soldering tool in 2, wherein said first rotary engagement means at said second end of said fastening sleeve is housed in a detent sleeve, said detent sleeve connected to said fastening sleeve at a first end.

5. The soldering tool in 2, whereby said first rotary engagement means at said second end of said fastening sleeve includes at least one detent projection extending in an inwardly direction.

6. The soldering tool in 5, whereby two detent projections are diametrically opposite each other on said second end of said fastening sleeve and two detent grooves are diametrically opposite each other at said first end of said soldering tip.

* * * * *